United States Patent
Kuo

(10) Patent No.: US 6,325,357 B1
(45) Date of Patent: Dec. 4, 2001

(54) THREE-WAY VALVE STRUCTURE

(76) Inventor: Wen-Li Kuo, No. 10, Fang Dong Road, Wen Chin Tsun, Fang Yuan Hsiang, Chang Hua Hsien (TW)

( * ) Notice: Subject to any disclaimer, the term of this patent is extended or adjusted under 35 U.S.C. 154(b) by 0 days.

(21) Appl. No.: 09/579,472

(22) Filed: May 26, 2000

(51) Int. Cl.⁷ .............................. F16K 5/06; F02K 11/00
(52) U.S. Cl. .................... 251/315.14; 137/15.22
(58) Field of Search .................. 251/315.14, 315.16, 251/315.01

(56) References Cited

U.S. PATENT DOCUMENTS

| | | | |
|---|---|---|---|
| 2,788,016 | * | 4/1957 | Scherer . |
| 3,380,708 | * | 4/1968 | Scaramucci . |
| 5,102,098 | * | 4/1992 | Daghe et al. .......................... 251/315 |
| 6,041,806 | * | 3/2000 | Maichel ............................. 137/15.22 |

* cited by examiner

Primary Examiner—Kevin Shaver
Assistant Examiner—David A Bonderer
(74) Attorney, Agent, or Firm—Dougherty & Troxell

(57) ABSTRACT

The invention, a kind of improved three-way valve structure is to install a ball valve inside the main structure of a three-way valve. The top of the ball valve equips a clip base and the lateral sides of its opening equip guiding tracks. The bottom of a turning bar equips a clip base. After assembling a washer on a tuning bar, it is placed inside the valve majority. The ball valve is installed inside a valve majority by using a guiding bar. The clip groove on a ball valve fits the clip base on a turning bar for positioning. After moving guiding bar backward and placing a washer, finally a positioning ring is fitted for completion of assembly and effect of convenient assembly is achieved.

1 Claim, 4 Drawing Sheets

FIG2-A
PRIOR ART
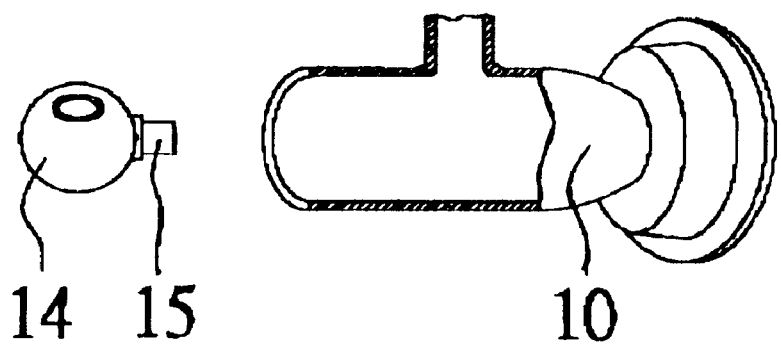
FIG2-B
PRIOR ART
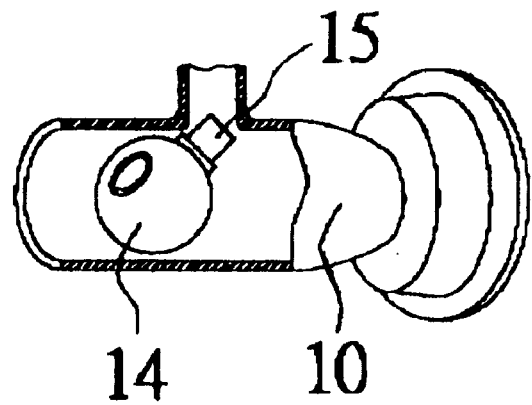
FIG2-C
PRIOR ART
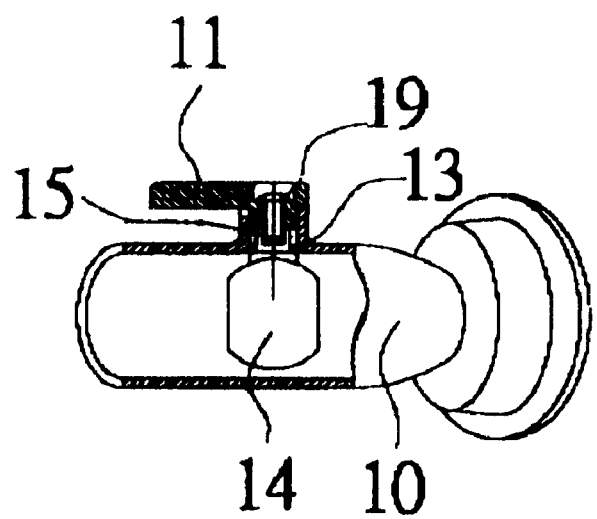

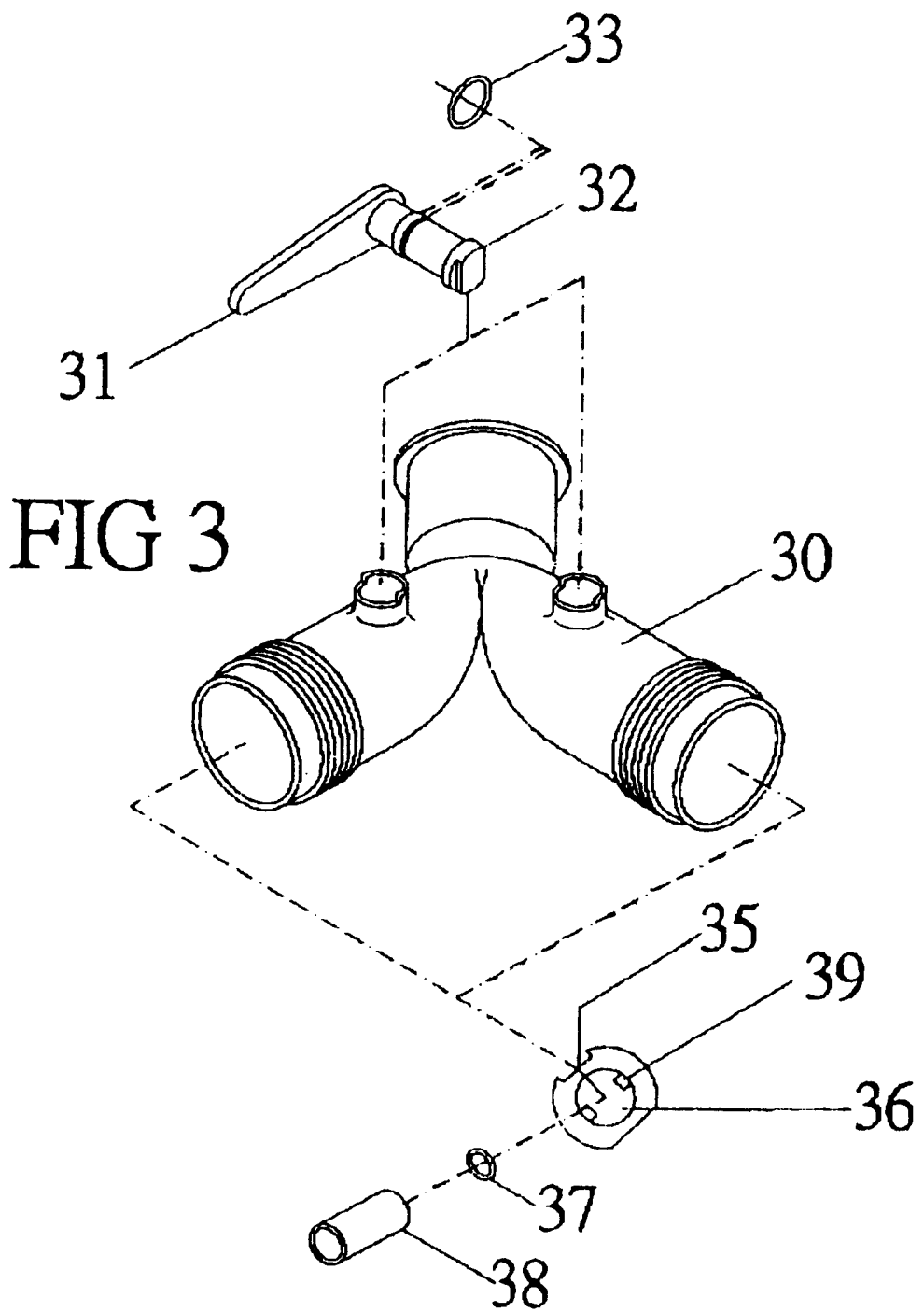

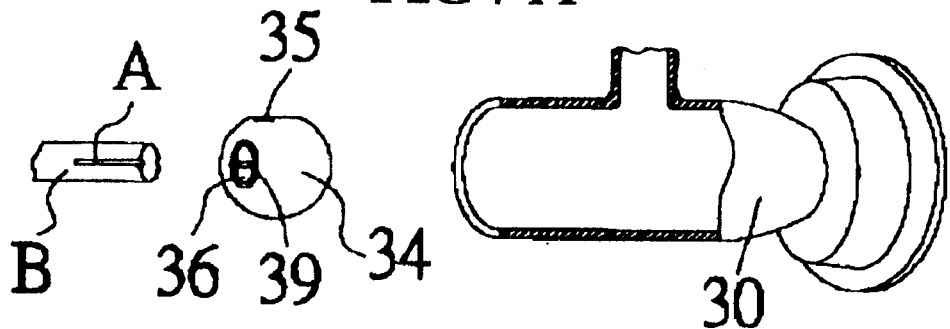
FIG4-A
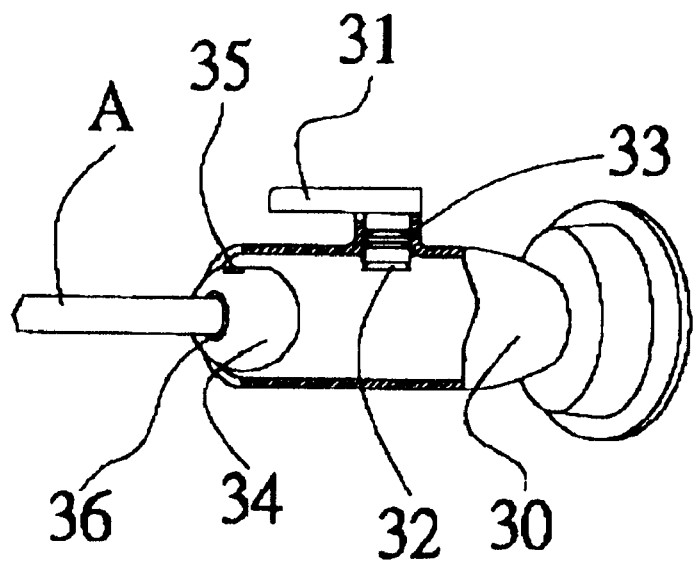
FIG4-B
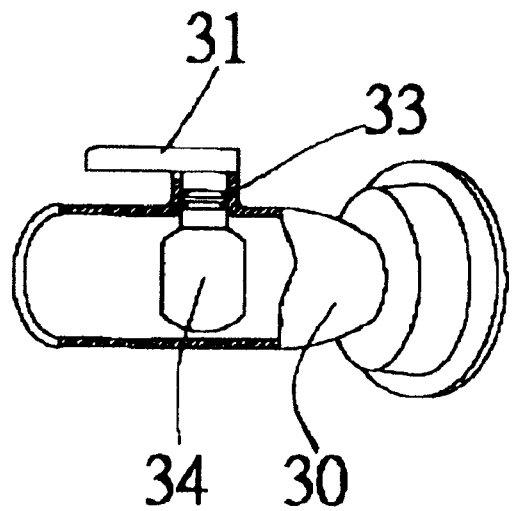
FIG4-C

THREE-WAY VALVE STRUCTURE

BACKGROUND OF THE INVENTION

1) Field of the Invention

The invention, a kind of improved three-way valve structure is to install a ball valve inside a three-way valve majority. The ball valve is installed inside the valve majority by using a guiding bar. After a washer is placed on a turning bar set, it is installed in the valve majority. The clip groove on a ball valve fits in the clip base on a turning bar for positioning. Thus assembly is completed and convenient assembly is achieved.

2) Description of the Prior Art

Please refer FIG. 1, an isometric drawing for three-way valve elements of prior art. As shown in the figure, a three-way valve is a three-way connected tubular object. For each of two sets of control valve majorities 10, the assembly elements equip a spherical ball valve 14. In the spherical center of the valve, there is penetration opening 16 with clip bar 15 in the top for positioning and stopper 17 together with positioning ring 18 in a conduit. After ball valve 14 is inserted and fixed inside valve majorities 10, washer 13 is placed from the top and turning bar 11 is equipped. After the completion of all the major elements are assembled, screw 19 is driven to fix turning bar 11 on ball valve 14 for proper fixture.

The process of assembly positioning for ball valve 14 is illustrated as follows: (Please refer FIG. 2-A, FIG. 2-B, and FIG. 2-C: an exploded assembly drawing for a ball valve of prior art in an open state.)

First, please refer FIG. 2-A. As shown in the figure, the issue to be understood is that ball valve 14 must be inserted in a transversal way because the total length of ball valve 14 is greater than the diameter of a conduit inside valve majority 10. Next, please refer FIG. 2-B. As shown in the figure, after ball valve 14 is inserted in the rear end of the conduit on an upper opening, slowly erect ball valve 14 according to the penetration angle and upper space. Then, please refer FIG. 2-C. After ball valve 14 is erected, place washer 13 and turning bar 11 accordingly. Finally, drive screw 19 for positioning and the assembly process is completed.

On the basis of assembly process of ball valve for three-way valve of prior art, it can be concluded as follows:

Because the total length of ball valve 14 is greater than the diameter of a conduit, ball valve 14 must be inserted to the conduit in a transversal way. To erect ball valve 14, no tool can be applied for the movement of angle change, thus ball valve 14 must be inserted by hand operation. After the placement of ball valve 14, clip bar 15 on ball valve 14 penetrates a conduit by inclined push and is fixed with screw 19 for fixture. Although the assembly process is not complicated and ball valve 14 can not be effectively held with by tool, the assembly is inconvenient.

Due to the above defectives for inconvenient assembly process for prior three-way valves, the inventor realized that there is a need for further study of product improvement and researched to overcome the disadvantages of prior products. After numerous experiments, the invention is eventually developed.

The main design concept for the invention is to improve the majority of a ball valve to enhance assembly efficiency by the aid of tool.

The followings are brief description for optimal embodiments of the invention for committee's better understanding in the structural assembly and operations of the invention.

BRIEF DESCRIPTION OF THE DRAWINGS

FIG. 2-A is an exploded assembly drawing for a ball valve of prior art in an open state.

FIG. 2-B is an exploded assembly drawing for a ball valve of prior art in an open state.

FIG. 2-C is an exploded assembly drawing for a ball valve of prior art in an open state.

FIG. 3 is an isometric drawing for the embodiment of the invention.

FIG. 4-A is an exploded assembly drawing for a ball valve of the invention in an open state.

FIG. 4-B is an exploded assembly drawing for a ball valve of the invention in an open state.

FIG. 4-C is an exploded assembly drawing for a ball valve of the invention in an open state.

DETAILED DESCRIPTION OF THE PREFERRED EMBODIMENT

Figure 1:
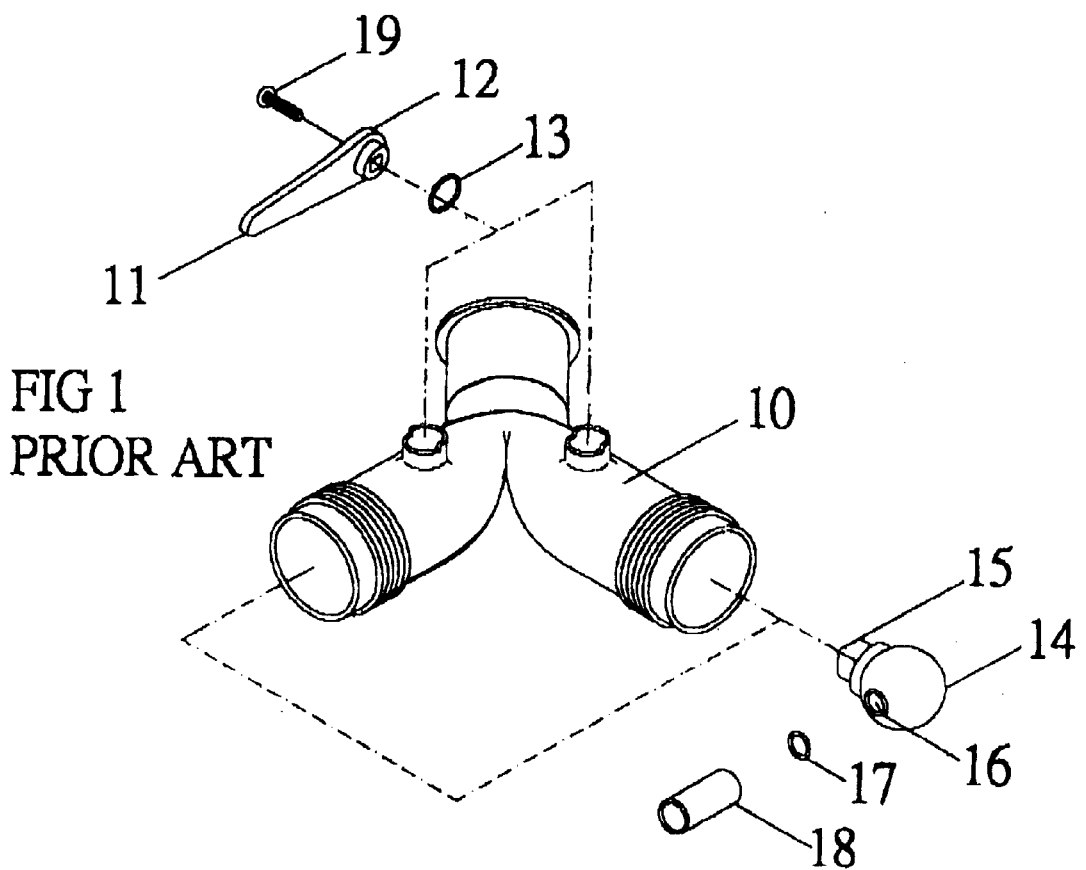
FIG. 1 is an isometric drawing for three-way valve elements of prior art.

Please refer FIG. 3, an isometric drawing for the embodiment of the invention. As shown in the figure, the main elements includes, valve body 30, two turning bars 31, two washers 33, two ball valves 34, two stoppers 37, and two positioning rings 38.

Please refer FIG. 3. As shown in the figure, three-way valve 30 is a three-way tubular object. The valve has identical element inside two control conduits. The elements include a spherical ball valve 34. In the spherical center of the valve, there is penetration opening 36 with positioning clip groove 35 in the top for fixture. Inside the opening, there are two parallel guiding tracks 39. Ball valve 34 is installed inside the conduit in valve body 30 for positioning and to fix the upper clip groove 35 and clip base 32 of turning bar 31 inserted from the top. Then, place washer 37 and finally fit positioning ring 38 for the completion of assembly.

Through above assembly process, the objective of assembly is as follows: Please refer FIG. 4-A, FIG. 4-B, FIG. 4-C. First, please refer FIG. 4-A, ball valve 34 for the invention has two parallel guiding tracks 39 inside penetration opening 36. Thus, guiding grooves B on guiding member A can penetrate guiding tracks 39 of ball valve 34. Because ball valve 34 is constrained by guiding member A, it easily enters the conduit of valve body 30. As shown in FIG. 4-B, after ball valve 34 enters the conduit of valve body 30 from upper opening, washer 33 is placed on turning bar 31. Then, when ball valve 34 is placed in right position, clip groove 35 is firmly fixed with clip base 32. As shown in FIG. 4-C, after ball valve 34 is properly located by position fixture of turning bar 31, the guiding member A is removed and the installation is completed.

On the basis of assembly process of ball valve 34 for three-way valve of prior art, it can be concluded as follows:

Because penetration opening 36 on the invention of ball valve 24 has parallel guiding tracks 39 engaging guiding grooves B on guiding member A, it can be inserted in the conduit in a vertical position. The clip groove 35 on ball valve 34 is firmly fixed to clip base 32 on turning bar 31 for direct fixture. Screw positioning is not needed. Thus, the effects of convenient assembly and fast assembly positioning are achieved.

What is claimed is:

1. A method of assembling a ball valve structure comprising the steps of:

a) providing a valve body having two control conduits therethrough each with at least one end, and turning bar openings in communication with the conduits;

b) providing a spherical ball valve member having a penetration opening therethrough, a clip groove on an outer surface and two, parallel guiding tracks extending into the penetration opening;

c) providing a guiding member having two guiding grooves adjacent to an end thereof;

d) placing the end of the guiding member into the penetration opening of the ball valve member such that the guiding grooves are engaged by the guiding tracks;

e) moving the ball valve member into one of the two control conduits through the at least one end while on the guiding member until the clip groove is aligned with one of the turning bar openings;

f) providing a turning bar with a clip base thereon;

g) inserting the turning bar into the turning bar opening until the clip base engages the clip groove; and, h) removing the guiding member from the ball valve member.

* * * * *